United States Patent
Kim

(10) Patent No.: US 12,103,631 B2
(45) Date of Patent: Oct. 1, 2024

(54) MODULAR INTERCHANGEABLE PERSONAL MOBILITY DEVICE

(71) Applicants: HYUNDAI MOTOR COMPANY, Seoul (KR); KIA CORPORATION, Seoul (KR)

(72) Inventor: Do Kon Kim, Hwaseong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 0 days.

(21) Appl. No.: 18/509,738

(22) Filed: Nov. 15, 2023

(65) Prior Publication Data

US 2024/0190530 A1 Jun. 13, 2024

(30) Foreign Application Priority Data

Dec. 9, 2022 (KR) ........................ 10-2022-0171873

(51) Int. Cl.
| | |
|---|---|
| B62K 19/30 | (2006.01) |
| B62B 3/02 | (2006.01) |
| B62B 7/14 | (2006.01) |
| B62K 5/007 | (2013.01) |
| B62K 15/00 | (2006.01) |

(52) U.S. Cl.
CPC ................ *B62K 19/30* (2013.01); *B62B 3/02* (2013.01); *B62B 7/142* (2013.01); *B62K 5/007* (2013.01); *B62K 15/006* (2013.01); *B62K 2202/00* (2013.01)

(58) Field of Classification Search
CPC ...... A61H 2201/0107; A61H 2003/002; A61H 2003/003; A61H 2003/004; B62N 2/30; B60N 2002/971; B62K 19/30; B62K 19/36; B62K 15/006; B62K 2202/00; B62B 2205/30; B62B 7/142
See application file for complete search history.

(56) References Cited

U.S. PATENT DOCUMENTS

| | | |
|---|---|---|
| 2013/0099526 A1 | 4/2013 | Mildner et al. |
| 2019/0143875 A1 | 5/2019 | Pham |
| 2020/0122659 A1 | 4/2020 | Campana |
| 2020/0247481 A1 | 8/2020 | Barnicle et al. |
| 2021/0331749 A1 | 10/2021 | Hwang et al. |

FOREIGN PATENT DOCUMENTS

| | | |
|---|---|---|
| CN | 105905165 A | 8/2016 |
| KR | 2020-0071898 A | 6/2020 |

*Primary Examiner* — Jason D Shanske
*Assistant Examiner* — Matthew James O'Neill
(74) *Attorney, Agent, or Firm* — MCDONNELL BOEHNEN HULBERT & BERGHOFF LLP

(57) ABSTRACT

A modular interchangeable mobility device comprises an electric platform comprising a base platform which comprises wheels, a motor to drive the wheels and a battery to supply power to the motor, and an upper coupling part configured to be detachably coupled with an upper module located on the base platform, and a folding-type chair attached to the base platform and configured to provide a space for the upper module when folded and serve when unfolded as a seat such that the modular interchangeable mobility device may be used as an electric scooter.

15 Claims, 13 Drawing Sheets

A – A cross-section

MODULAR INTERCHANGEABLE PERSONAL MOBILITY DEVICE

CROSS REFERENCE TO RELATED APPLICATIONS

The present application claims priority to Korean Patent Application No. 10-2022-0171873, filed on Dec. 9, 2022, the entire contents of which is incorporated herein by reference in its entirety.

TECHNICAL FIELD

The present disclosure relates to a personal mobility device, and more particularly, to a modular interchangeable personal mobility device in which various types of upper modules are easily replaced and coupled to one electric platform so that a single electric platform may be used as personal mobility device of various purposes depending on the type of an upper module.

BACKGROUND

Recently, the use of personal mobility devices for various purposes that utilizes the power of a battery is increasing. In addition, the types of electric scooters are expanding to various types that can be moved by the power of batteries such as electric wagon, electric stroller, lawn mower, and snow removal equipment, etc.

However, since the personal mobility device of the related art can only be purchased for a singular purpose, each of the personal mobility devices should be provided with a product manufactured according to the purpose if it is intended to use the personal mobility device in various purposes.

SUMMARY

As a result of the related art, there is an issue of hindrance in the use of personal mobility devices due to an increase in cost burden for purchasing each type of personal mobility device and a lack of storage areas.

Various aspects of the present disclosure are directed to providing a modular interchangeable personal mobility device which enables a single electric platform to be used as a personal mobility device for various purposes depending on the type of an upper module by simply replacing and combining various types of upper modules with one electric platform.

A modular interchangeable mobility device according to an embodiment of the present disclosure comprises an electric platform comprising a base platform which comprises wheels, a motor to drive the wheels and a battery to supply power to the motor, and an upper coupling part configured to be detachably coupled with an upper module located on the base platform, and a folding-type chair attached to the base platform and configured to provide a space for the upper module when folded and serve when unfolded as a seat such that the module interchangeable mobility is used as an electric scooter.

In at least one embodiment of the present disclosure, the folding-type chair comprises a chair seat on which a user can sit, a frame connected to the chair seat and the base platform in a foldable manner, and configured to support the chair seat above the base platform when unfolded, and a folding restrictor configured to be engaged with the frame such that the frame is prevented from folding in an unfolded state.

In at least one embodiment of the present disclosure, the folding restrictor comprises a knob ratably attached to the base platform, a coupling pin configured to move linearly by a rotation of the knob to be inserted into a fixing hole of the frame, and a connection bar connected to the knob and the coupling pin and configured to convert the rotation of the knob into a linear movement of the coupling pin.

In at least one embodiment of the present disclosure, the folding restrictor further comprises a connection shaft passing through a shaft of the knob and coupled with the connection bar.

In at least one embodiment of the present disclosure, the connection bar is configured in a semicircular shape and coupled between the coupling pin and the connection shaft by a rotatable fixing pin.

In at least one embodiment of the present disclosure, the folding restrictor further comprises a pin fixing block fixed to the base platform and configured to allow the coupling pin to pass through.

In at least one embodiment of the present disclosure, the upper module is a wagon module, and the wagon module includes a wagon seat providing a space therein for an infant or things being loaded, and a base coupling part attached to the wagon seat and configured to be coupled with the upper coupling part of the electric platform.

In at least one embodiment of the present disclosure, the base coupling part comprises a insert-type coupler configured to be coupled with the upper coupling part by one of the insert-type coupler and the upper coupling part being inserted into the other, and a hook coupler fixing the wagon seat to the base platform by hooking the upper coupling part.

In at least one embodiment of the present disclosure, the insert-type coupler comprises a fitting recess recessed inward from a lower surface of the wagon seat to provide a space into which the upper coupling part is inserted, and wherein the upper coupling part comprises a protrusion protruding upward from the base platform and bent toward the wagon seat to be inserted and fitted into the space of the fitting recess.

In at least one embodiment of the present disclosure, the wagon seat further comprise a plurality of bottom protrusions protruding downward from a bottom surface of the wagon seat, and wherein the upper coupling part comprises correspondingly a plurality of grooves into which the plurality of bottom protrusions are fitted.

In at least one embodiment of the present disclosure, the hook coupler comprises a hook mounted at one side of the wagon seat and comprising a bent end pushed outward by a spring, and a button exposed at one side of the wagon seat and configured to apply an external force of pressing the spring to push the hook in, and wherein the upper coupling part comprises a first fitting groove configured to allow the hook to be inserted to be hooked.

In at least one embodiment of the present disclosure, the upper module is a stroller module, and the stroller module comprises a stroller seat, a stroller frame supporting the stroller seat apart from the base platform, and a base coupling part provided at a lower part of the stroller frame and configured to be coupled with the upper coupling part of the electric platform.

In at least one embodiment of the present disclosure, the base coupling part comprises a insert-type coupler configured to be coupled with the upper coupling part by one of the insert-type coupler and the upper coupling part being inserted into the other, and the hook coupler fixing the stroller frame to the base platform by hooking the upper coupling part.

In at least one embodiment of the present disclosure, the insert-type coupler configures a fitting recess recessed inward from a lower surface of the wagon seat to provide a space into which the upper coupling part is inserted, and wherein the upper coupling part comprises a protrusion protruding upward from the base platform and bent toward the wagon seat to be inserted and fitted into the space of the fitting recess.

In at least one embodiment of the present disclosure, wherein the hook coupler comprises a hook mounted at one side of the wagon seat and comprising a bent end pushed outward by a spring, and a button exposed at one side of the wagon seat and configured to apply an external force of pressing the spring to push the hook in, and wherein the upper coupling part comprises a first fitting groove configured to allow the hook to be inserted to be hooked.

According to the above-described various embodiments of the present disclosure, upper modules of various types are simply replaced and coupled to one electric platform, and thus a single electric platform may be used as personal mobility device for various purposes according to the type of upper module.

In addition, according to the present disclosure, when the module is replaced, hook coupling is naturally performed after the upper module is fitted into the base platform, and when the module is separated, the upper module can be easily separated by releasing the hook through pressing the button and lifting the upper module.

In addition, according to the present disclosure, it is possible to replace upper modules of various types with the single electric platform, and thus there is an effect of reducing purchase costs as compared with the case of having personal mobility device of various types.

Effects obtainable from the present disclosure are not limited to the above-mentioned effects, and other effects not mentioned will be clearly understood by those skilled in the art from the following description.

DETAILED DESCRIPTION

Figure 1:
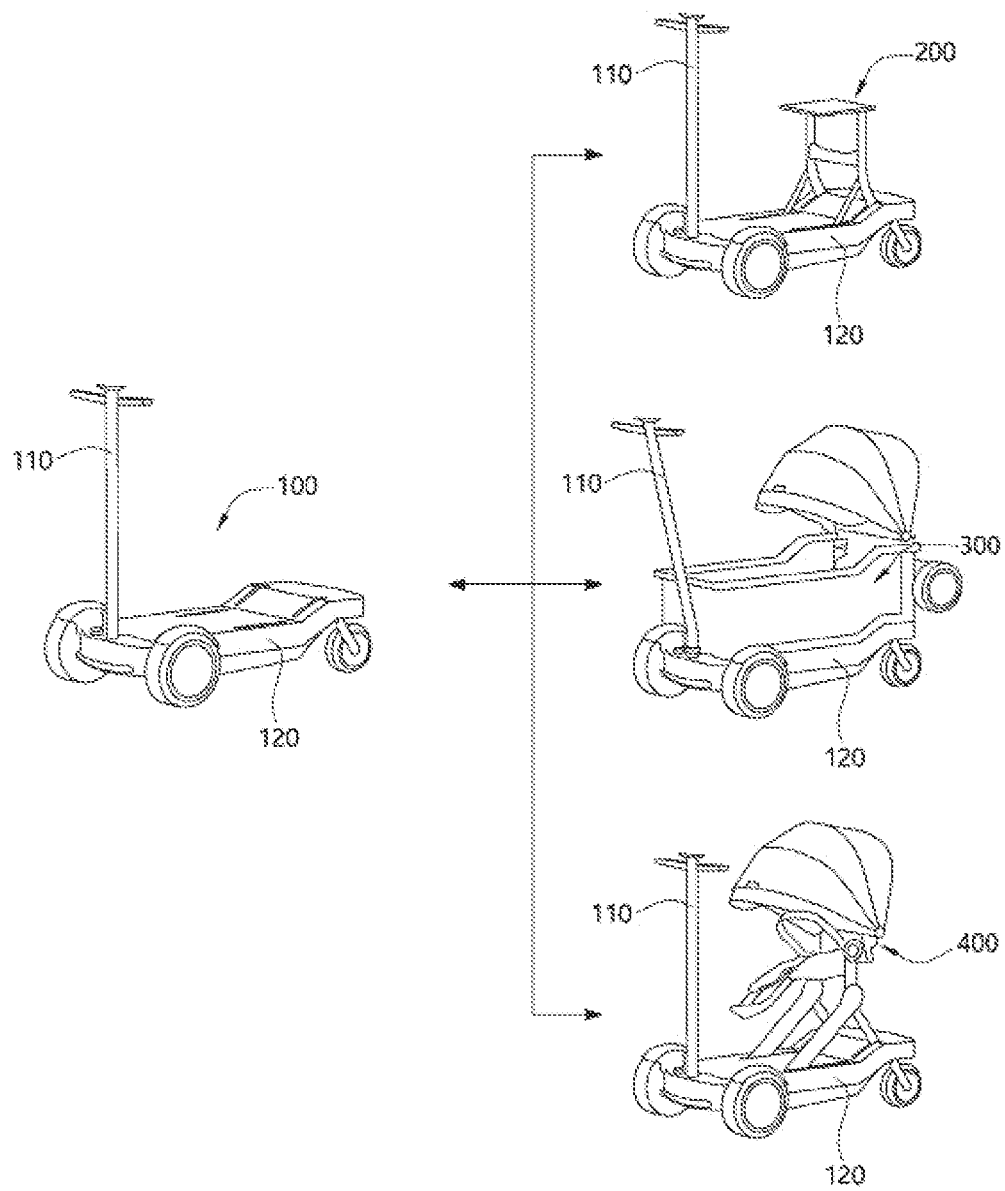
FIG. 1 is an illustration showing the replacement of an upper module coupled to an electric platform in accordance with the present disclosure for a use of a personal mobility device of various purposes.

Hereinafter, the embodiments disclosed in the present specification will be described in detail with reference to the accompanying drawings, in which like reference numerals refer to like elements regardless of the reference numerals, and redundant descriptions thereof will be omitted. In the following description, suffixes "module" and "unit" for the elements are given or used in combination only in consideration of the ease of description, and do not have meanings or roles distinguished from each other by themselves. In addition, in describing the embodiments disclosed in the present specification, when it is determined that a detailed description of the related known technology may obscure the gist of the embodiments disclosed in the present specification, the detailed description thereof will be omitted. In addition, the accompanying drawings are merely for easily understanding the embodiments disclosed in the present specification, and the technical concept disclosed in the present specification is not limited by the accompanying drawings, and it should be understood that all changes, equivalents, and substitutes included in the concept and technical field of the present disclosure are included.

Terms including ordinal numbers such as "first," "second," and the like can be used to describe various elements, but the elements are not limited by the terms. The terms are used only for the purpose of distinguishing one element from another element.

When it is stated that a component is "connected" or "linked" to another element, it should be understood that the element may be directly connected or linked to the other element, but another element may exist in between. On the other hand, when it is mentioned that an element is "directly connected" or "directly linked" to another element, it should be understood that another element does not exist in between. Further, a singular expression includes a plural expression unless the context clearly indicates otherwise.

It should be understood that the terms "include" or "have" in this specification are intended to designate the presence of a feature, a number, a step, an operation, a component, a part or a combination thereof described in the specification, but do not preclude the possibility of the presence or addition of one or more other features, numbers, steps, operations, components, parts or combinations thereof.

Hereinafter, embodiments of the present disclosure will be described in detail with reference to FIGS. 1 to 13.

Figure 2B:
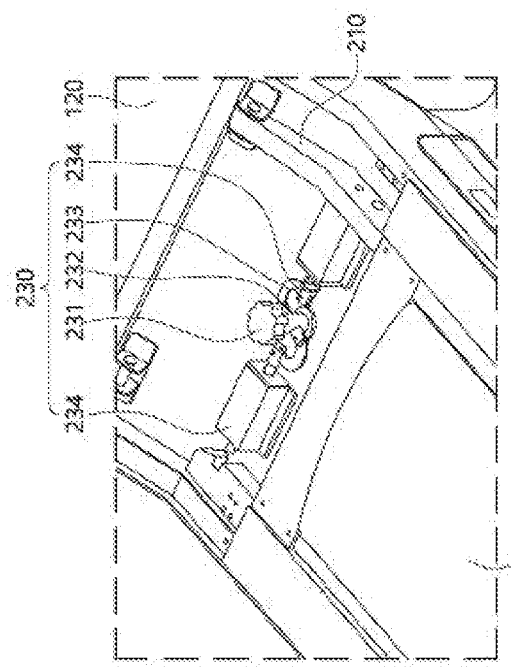
FIGS. 2A and 2B are a schematic diagrams showing the operation of a folding restrictor deploying a chair for use as an electric scooter in accordance with the present disclosure.
Figure 2A:
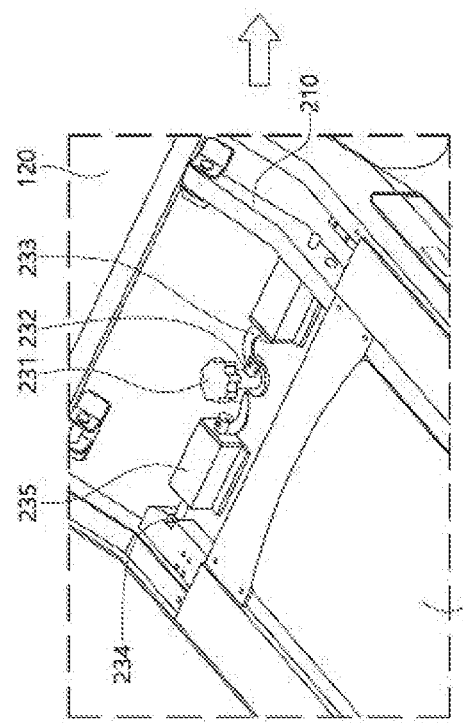
Figure 3:
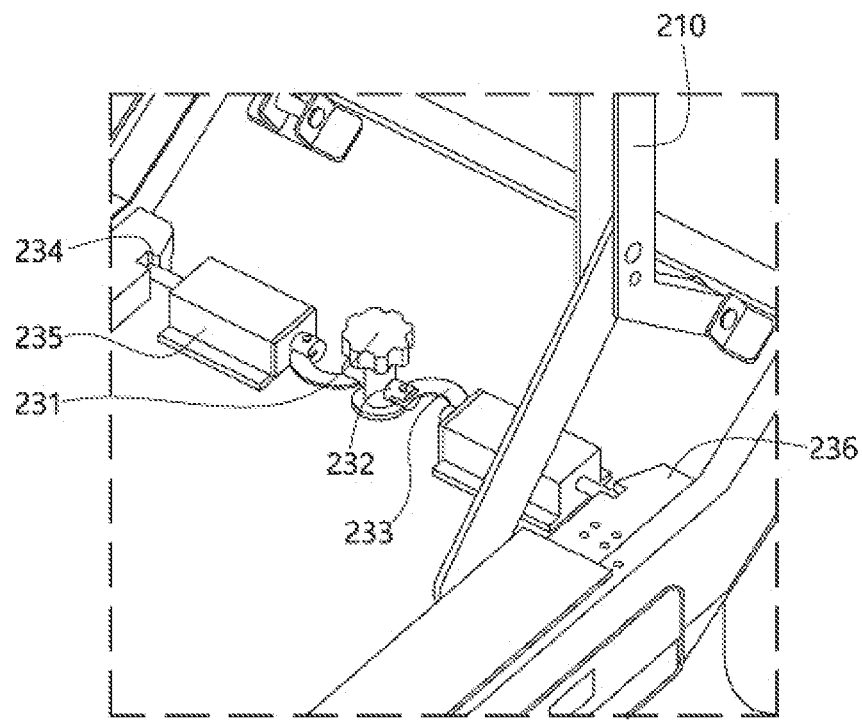
FIG. 3 is a configuration diagram illustrating a state in which a chair has been deployed for use as an electric scooter in accordance with the present disclosure.
Figure 4:
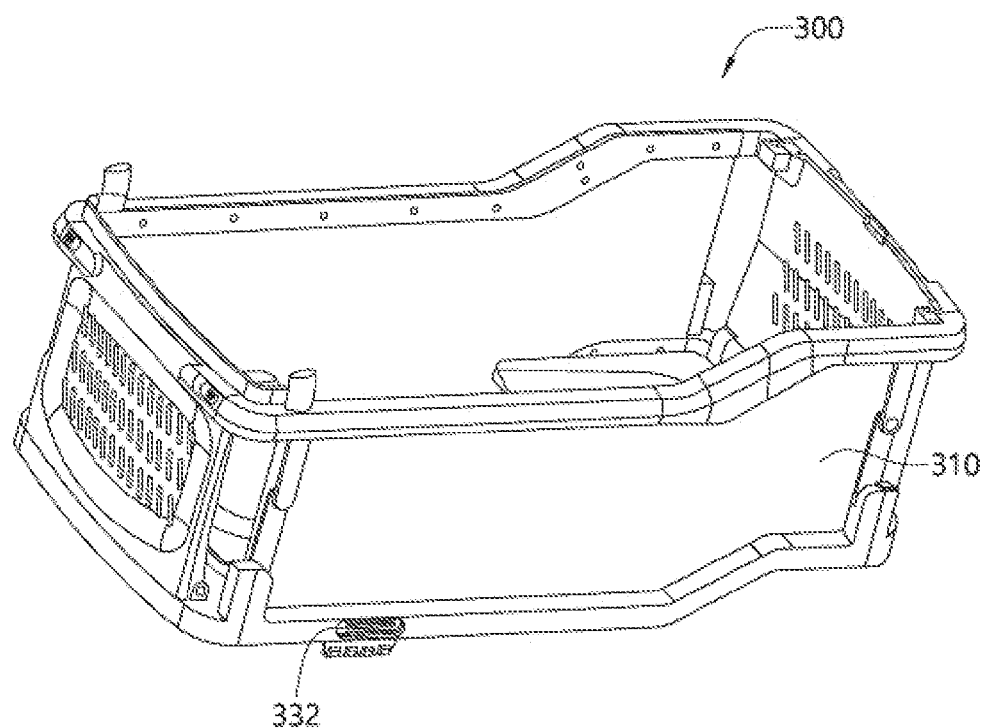
FIG. 4 is a perspective view of a wagon module coupled to an electric platform in accordance with the present disclosure.

FIG. 1 is an exemplary view showing that an upper module coupled to an electric platform is replaced and used as a personal mobility device for various purposes according to the present disclosure, FIG. 2 is a configuration view showing the operation of a folding restrictor for unfolding a chair for use as an electric scooter according to the present disclosure, and FIG. 3 is a configuration view showing the state in which a chair is unfolded for use as an electric scooter according to the present disclosure.

Referring to FIGS. 1 to 3, a modular interchangeable personal mobility device according to the present disclosure may include an electric platform 100 with driving wheels provided at a lower part of a plate-shaped base platform by the power of a battery, an upper coupling part capable of replacing and coupling an upper module located at an upper part of the base platform, and a folding-type chair which is folded on one surface of the base platform to provide a space where an upper module coupled to the base platform is located, and is unfolded from the base platform when the electric platform is used as an electric scooter.

According to the present disclosure, the upper modules of various types are alternately coupled to one electric platform 100, so that the electric platform can be used as a personal mobility device for various purposes depending on the type of the upper module.

Accordingly, the present disclosure may be utilized as an electric scooter by using one electric platform, and may be utilized as an electric wagon by coupling a wagon module to the upper part of the base platform or as an electric stroller by coupling a stroller module to the upper part of the base platform, if necessary.

In this case, a folding-type chair may be built in the upper part of the electronic platform in order to improve the utility of the electronic platform itself without coupling the wagon module or the stroller module.

Accordingly, when the upper module is not coupled, the electric platform may be utilized as an electric scooter by deploying the folding-type chair, and when the electric platform is to be used for another purpose, the folding-type chair is folded to form the upper surface of the base platform, thereby providing a space in which the upper module to be coupled is located.

To this end, the electronic platform 100 as illustrated in FIG. 1 may include a steering unit 110 for controlling a direction of wheels driven by power of a battery, a plate-shaped base platform 120 for providing a space in which the upper module is located, and at least one upper coupling part formed on one surface of the base platform to fix the upper module located on the upper part of the base platform.

At this time, the base platform 120 may include a battery for supplying a driving power, an electric motor for generating power driven by the power of the battery, and a wheel for rotating by the power of the electric motor.

In addition, the upper coupling part may be variously formed according to the type of the upper module to be coupled to the base platform 120, and may include both a coupling means corresponding to the insert-type couplers 320 and 430 provided in the upper module and a coupling means corresponding to the hook couplers 330 and 440 provided in the upper module, as described below.

As described above, the coupling means corresponding to the insert-type coupler is provided to improve the convenience of coupling and separation, and the coupling step corresponding to the hook coupler is provided to improve stability of the coupling.

The upper coupling part has a feature corresponding to the insert-type coupler and the hook coupler provided in the upper module, and hereinafter, the feature of the upper coupling part corresponding to each upper module will be described together while describing each upper module.

In addition, the folding-type chair may include a chair seat 200 on which a user can sit, a frame 210 having one end connected to the chair and the other end connected to the base platform and supporting the chair in a state of being apart from the base platform in the unfolded state, a folding restrictor 230 for adjusting movement of a coupling pin to be coupled with the frame for folding or unfolding the frame.

As illustrated in FIGS. 2A and 2B, the folding restrictor 230 may include a knob 231 vertically installed on the base platform 120 and is rotatable, a coupling pin 234 fitted to or separated from a fixing hole formed in the frame while moving linearly by rotation of the knob, and a connection bar 233 connected to the knob and the coupling pin, respectively, and converts the rotation of the knob into a linear movement of the coupling pin 234.

In this case, as shown in FIGS. 2A and 2B, the knob 231 may further comprise a connection shaft 232 installed to vertically penetrate through a shaft of the knob vertically installed on the base platform, and the connection bar 233 may be coupled to the connection shaft 232.

In addition, as shown in FIGS. 2A and 2B, the connection bar 233 may be configured in a semicircular shape coupled to each of the coupling pin 234 and the connection shaft 232 by a separate rotatable fixing pin. As described above, when the connection bar 233 has a semicircular feature capable of rotating about the fixing pin, when the connection shaft 232 rotates by rotating the knob 231 as illustrated in FIG. 2B, the connection bar 233 coupled to the connection shaft is rotated and the coupling pin 234 coupled to the connection bar is pulled toward the knob to convert the rotational motion of the knob into the rectilinear motion of the coupling pin.

Accordingly, since the other end of the coupling pin 234 is released from the fixing hole formed in the frame 210, the frame 210 may be lifted up from the base platform 120 to deploy the chair seat 200.

At this time, a spring is provided inside the knob so that the coupling pin is usually configured to be pressed toward the fixing hole of the frame, thereby preventing the frame and the chair connected thereto from being separated from the base platform.

In addition, as shown in FIGS. 2A and 2B, the folding restrictor 230 may further include a pin fixing block 235 having a bottom surface fixed to the base platform in a state where the coupling pin is received therein.

Accordingly, the coupling pin 234 fitted to the fixing hole of the frame through the pin fixing block 235 is supported by the pin fixing block 235, so that it is possible to prevent the coupling pin 234 from being drawn out from the fixing hole or from being damaged such as being bent by an external force.

In addition, as shown in FIG. 3, after the frame is lifted from the base platform and the chair is unfolded, the folding restrictor 230 may be configured to prevent the frame from being folded again as the coupling pin 234 is fitted to the guide hole block 236 formed in the support unit of the frame which the frame has moved together while moving.

Accordingly, when the electric platform is to be used as an electric scooter, the chair can be unfolded by rotating the knob provided in the folding-type chair and extracting the coupling pin from the frame, and when another upper module is to be coupled, the chair can be folded by rotating the knob, extracting the coupling pin from the guide hole block, and rotating the frame toward the base platform.

In addition, the upper module coupled to the base platform 120 may be configured as the wagon module 300 as illustrated in FIGS. 5 to 9, and the wagon module 300 may include a wagon seat 310 having an empty interior to allow an infant can be seated on or load an object, and a base coupling part provided at a lower part of the wagon seat and coupled to an upper coupling part provided in the electric platform.

The base coupling part may comprise a insert-type coupler 320 having a coupling protrusion structure corresponding to each other and fitted and coupled to the upper coupling part, and a hook coupler 330 fixing the wagon seat to the base platform and having one end fitted and coupled to the upper coupling part.

Figure 5:
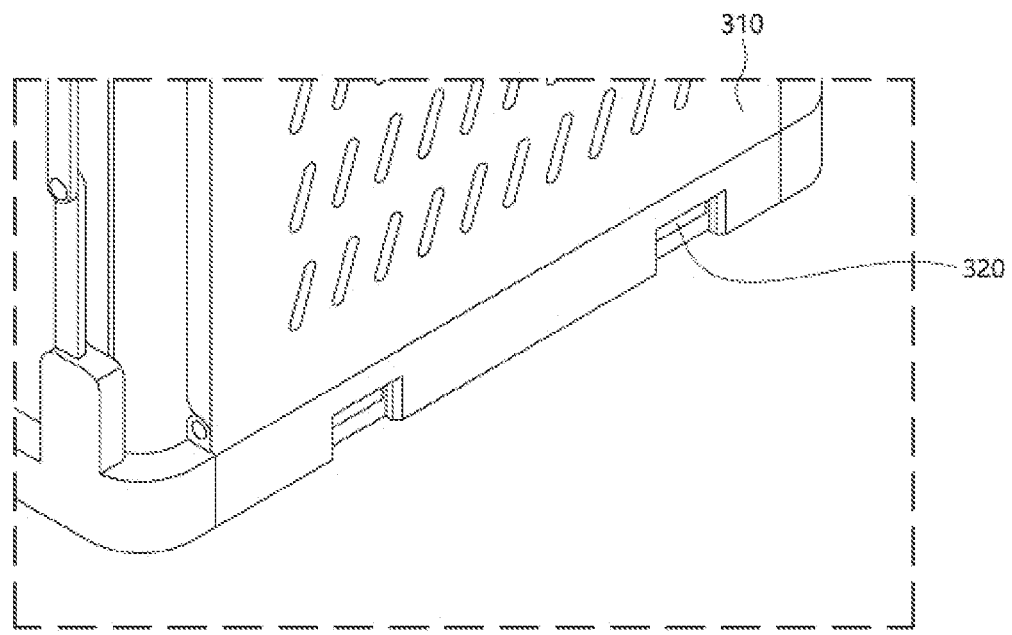
FIG. 5 is a block diagram illustrating an insert-type coupler of the wagon module according to the present disclosure.
Figure 7:
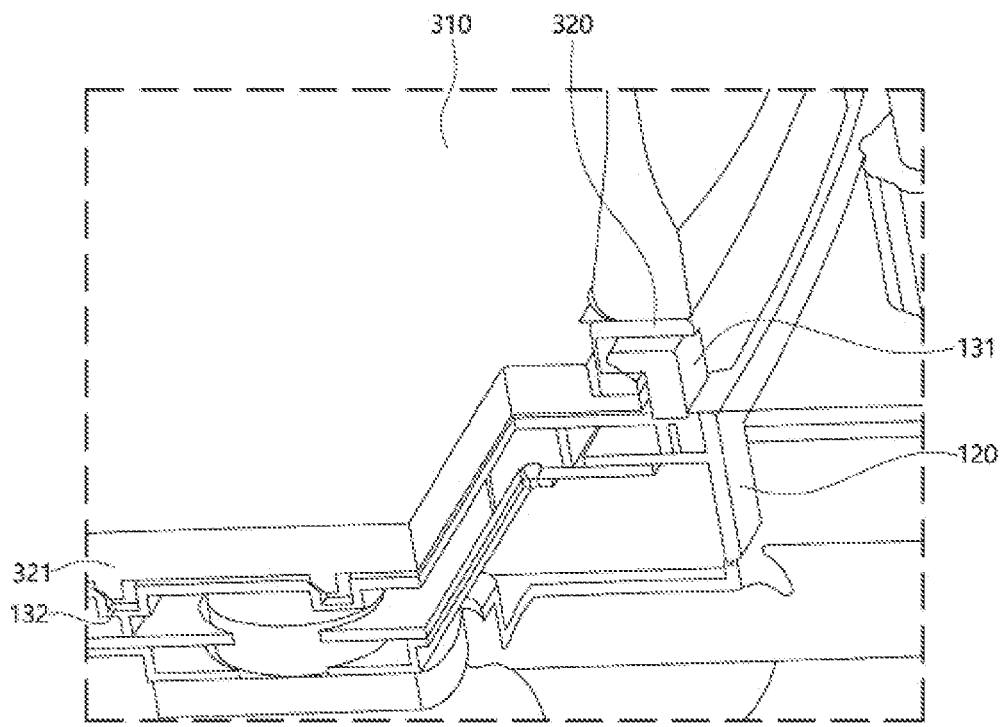
FIG. 7 is a cross-sectional view of a wagon module as it is fitted and coupled to a base platform in accordance with the present disclosure.

The insert-type coupler 320, as shown in FIGS. 5 and 7, may be formed as a fitting recess whose has a inwardly-bent space recessed from a lower part of one surface of the wagon seat to provide a space into which the upper coupling part is fitted. The fitting recess may be formed in an approximately "⊏" shape to provide an empty space therein.

Figure 6:
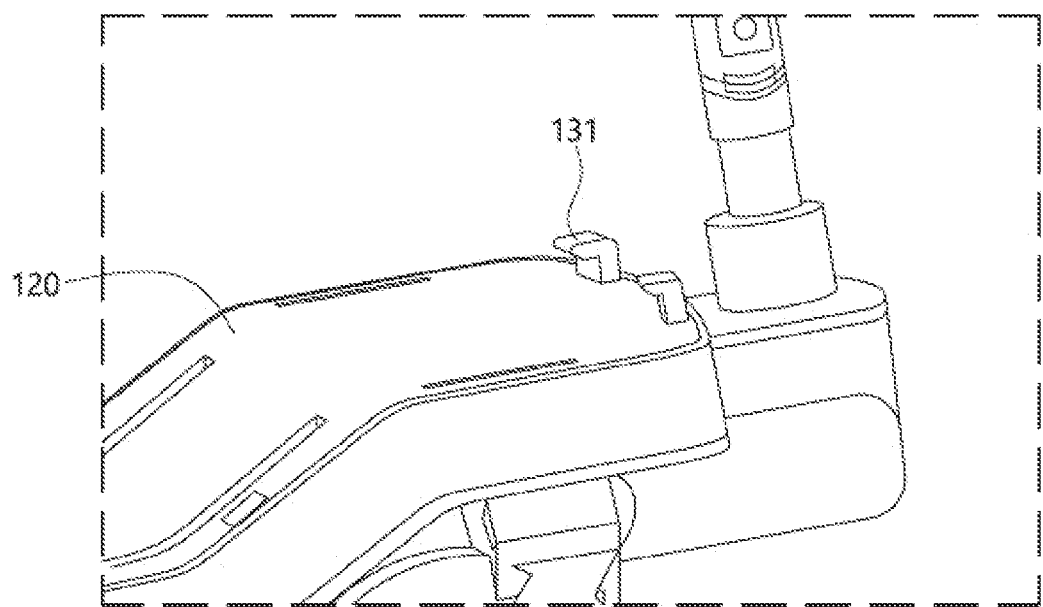
FIG. 6 is a block diagram illustrating a base platform for fitting and coupling a wagon module in accordance with the present disclosure.

At this time, as shown in FIGS. 6 and 7, the upper coupling part may be configured as a protrusion 131 which protrudes to the upper side of the base platform and is bent in one direction so as to be fitted to an inner space of the fitting recess.

Accordingly, the fitting recess is fitted and coupled to the protrusion while the wagon seat is moved to the base platform in an inclined state, whereby the wagon seat and base platform are fitted and coupled as shown in FIG. 6.

At this time, as shown in FIG. 7, a plurality of bottom protrusions protruding downward may be further formed on the bottom surface of the wagon seat, and correspondingly, a plurality of grooves into which the bottom protrusions may be fitted may be further formed in the upper coupling part.

As described above, the protrusions and the grooves are fitted and coupled to the bottom surface of the wagon seat, thereby reinforcing the engagement between the base platform and the wagon seat contacting the base platform over a wide area.

Here, in order for the fitting recess to be fitted and coupled to the protrusion, and the protrusion to be fitted and coupled to the groove to be easily coupled by simply lowering the wagon seat at an angle, the surface at which the fitting recess and the protrusion, and the surface at which the protrusion and the groove contact each other, may be formed in a diagonal shape.

Figure 8:
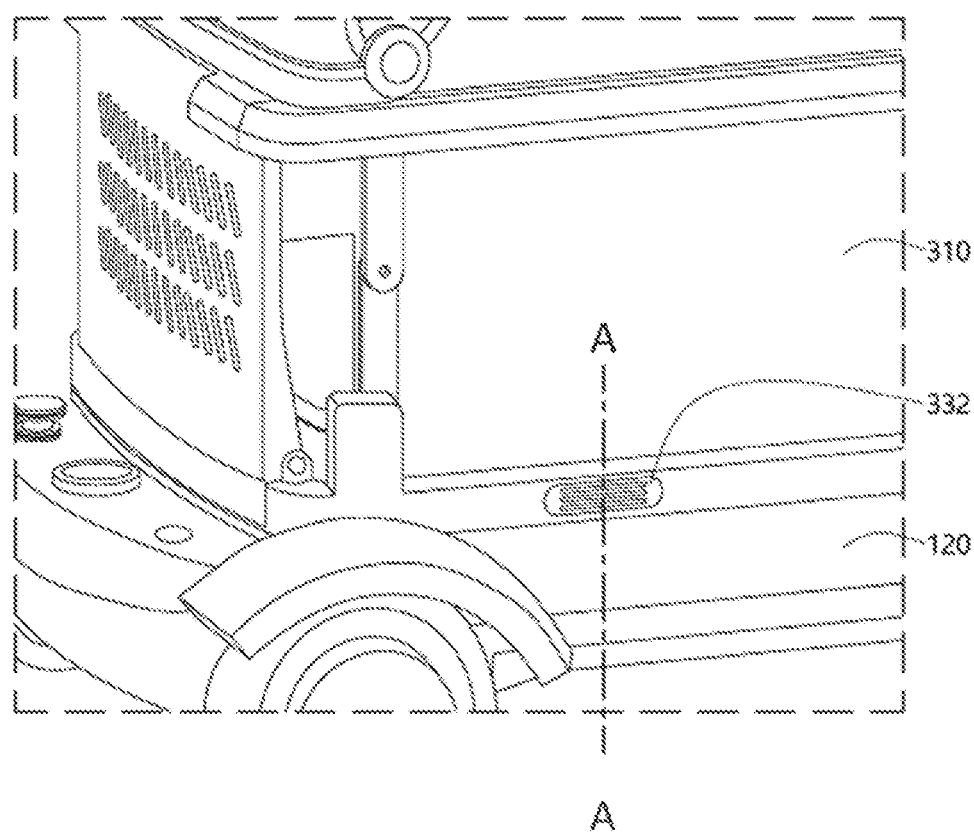
FIG. 8 is a block diagram showing a wagon module hooked to the base platform according to the present disclosure.
Figure 9:
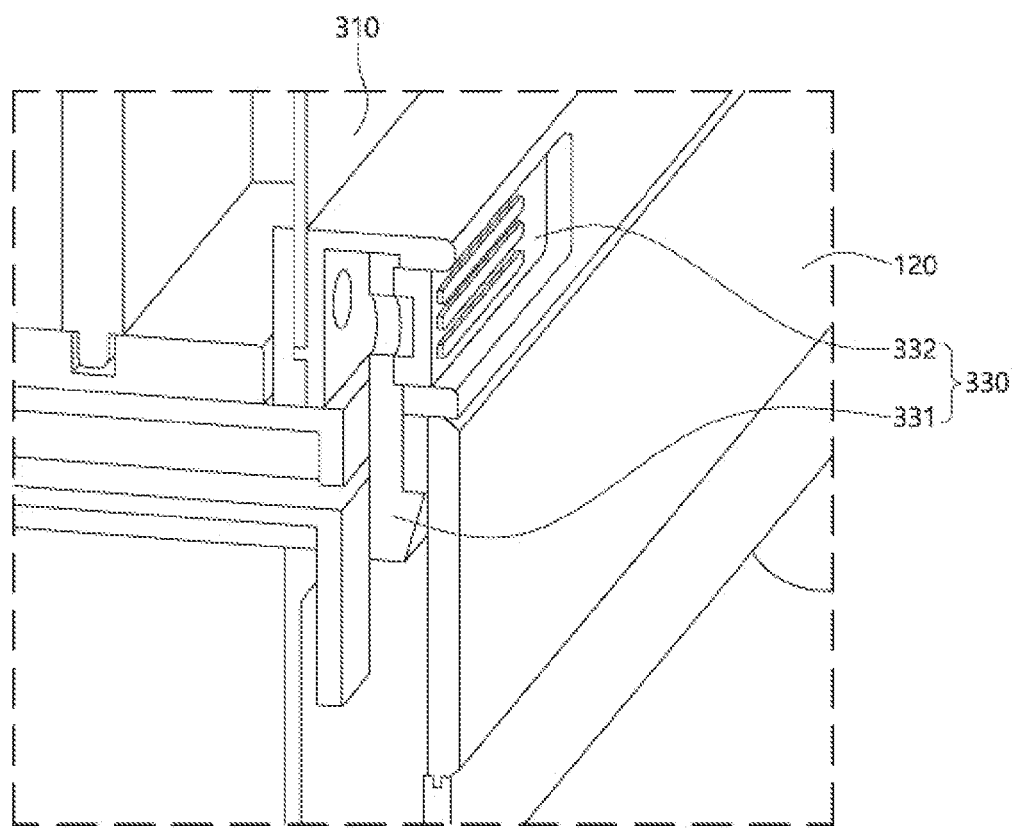
FIG. 9 is a partial cross-sectional view illustrating a hook-coupled state of a wagon module according to the present disclosure.

In addition, as shown in FIGS. 8 and 9, the hook coupler 330 may comprises a hook 331 installed at one side of the wagon seat to face downward, and having a bent end while being pushed outward by the spring, and a button 332 exposed at one side of the wagon seat to apply the external force for pushing the hook toward the inside of the wagon seat by pressing the spring.

In correspondence with the hook coupler 330, as shown in FIG. 9, the upper coupling part may be formed as a first fitting groove 132 having an empty interior to allow the hook to be inserted and providing a protrusion to which a bent unit of the inserted hook is caught.

At this time, the one end surface of the hook 331 is formed with a diagonal line as shown in FIG. 9, such that the hook can be smoothly coupled by sliding down along the inner surface of the first fitting groove 132 after being coupled at the insert-type coupler.

When the wagon seat is separated from the base platform, the button 332 may be pressed to move the hook 331 back and forth to the inner space of the first fitting groove 132, and then the hook may be lifted up to be easily separated.

In addition, the upper module coupled to the base platform may be configured as the stroller module 400 as illustrated in FIGS. 10 to 13, and the stroller module 400 may include a stroller seat 410 on which the infant can be seated, a stroller frame 420 supporting the stroller seat in a state of being apart from the vehicle platform, and a vehicle coupling unit provided at a lower part of the stroller frame and coupled to an upper coupling part provided on the electric platform.

In this case, the base coupling part similar to the wagon module may include an insert-type coupler 430 having a coupling protrusion structure corresponding to each other and fitted and coupled to the upper coupling part; and a hook coupler 440 fixing the stroller frame having one end fitted and coupled to the upper coupling part to the base platform.

Figure 10:
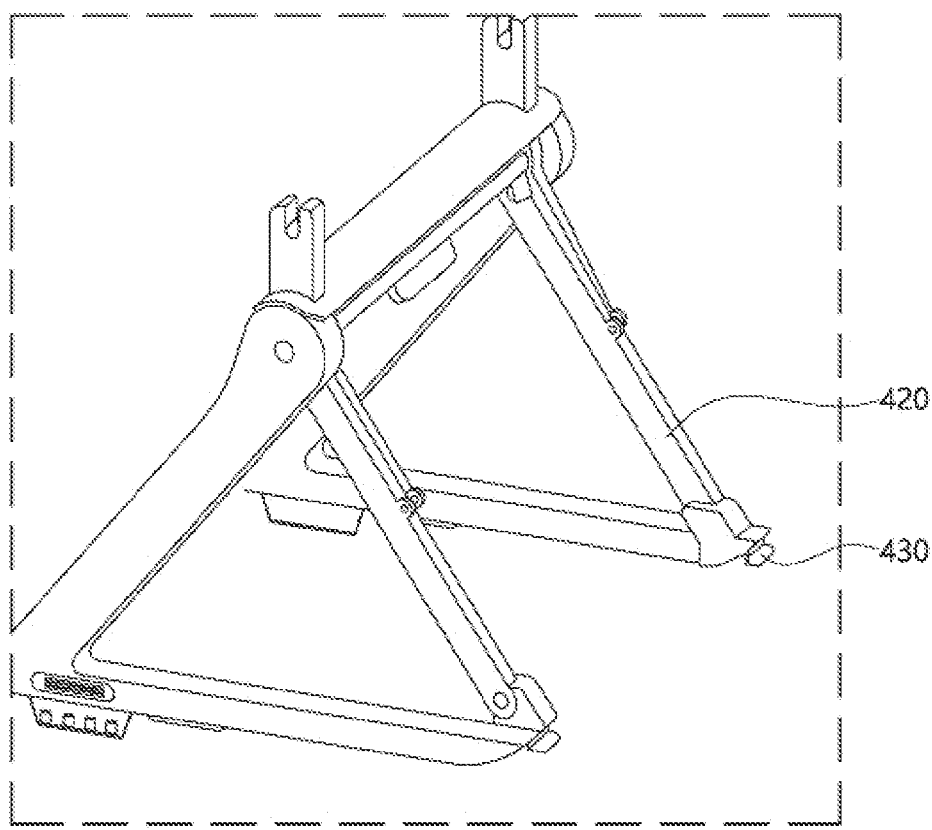
FIG. 10 is a block diagram illustrating a insert-type coupler of the stroller module according to the present disclosure.
Figure 12:
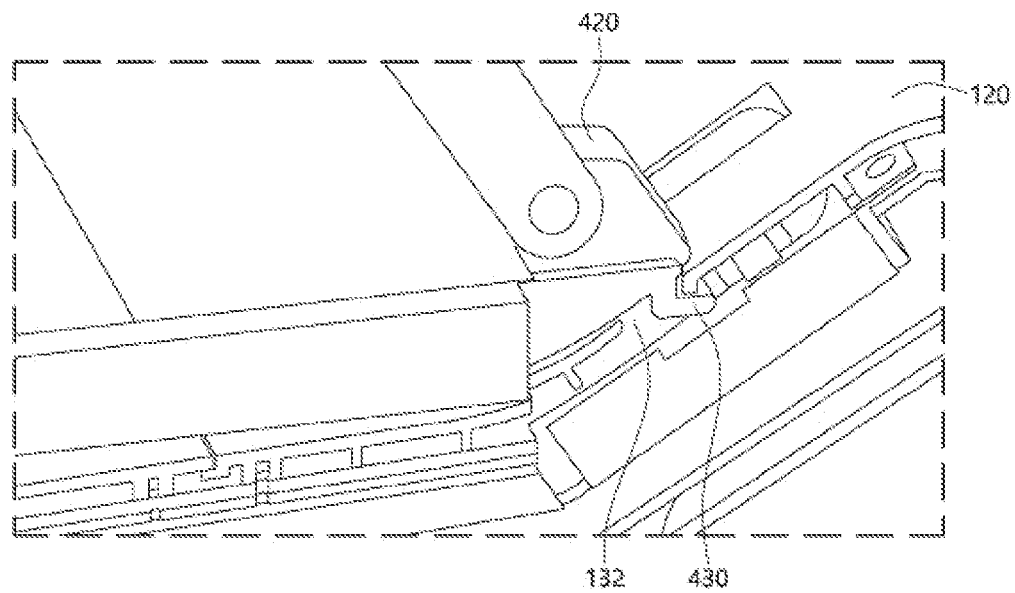
FIG. 12 is a block diagram illustrating the stroller module fitted and coupled to a base platform in accordance with the present disclosure.

As shown in FIGS. 10 and 12, the insert-type coupler 430 may be configured as a support protrusion which is bent outward from the lower part of the stroller frame and is fitted into a second fitting groove forming the upper coupling part.

Figure 11:
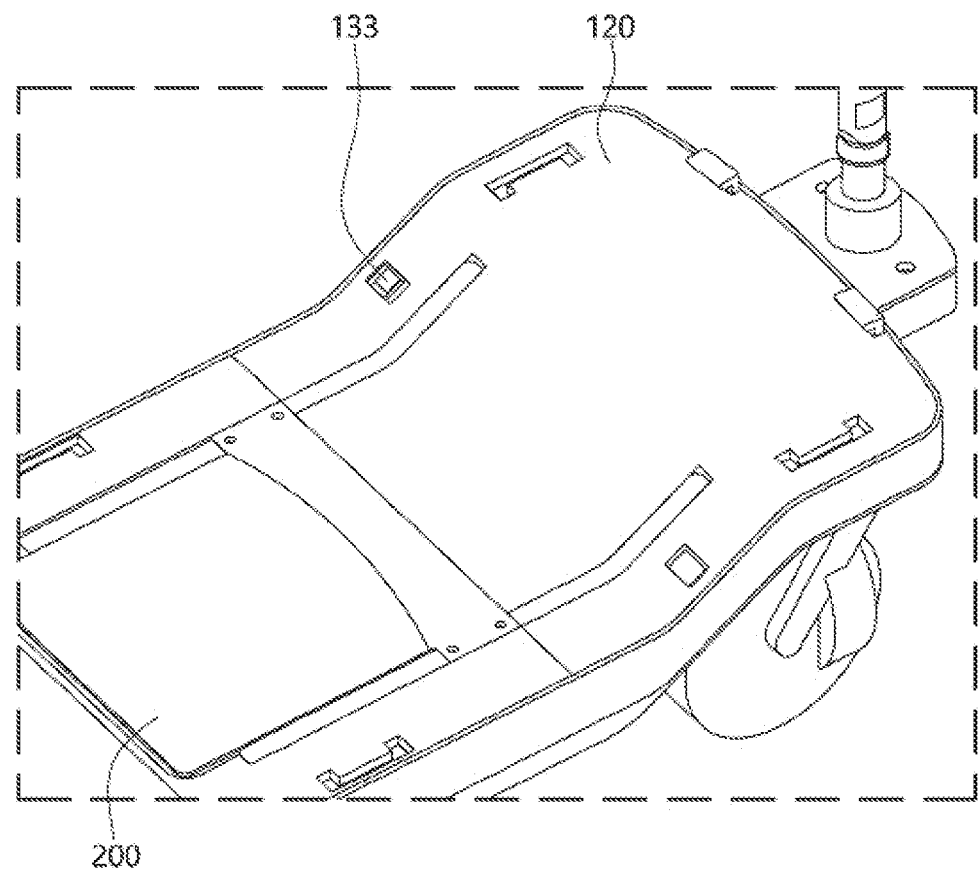
FIG. 11 is a block diagram illustrating a base platform for fitting and coupling the stroller module in accordance with the present disclosure.

At this time, the upper coupling part, as shown in FIGS. 11 and 12, may be configured with a second fitting groove 133 formed on one upper surface of the base platform to provide a space where the support protrusion is fitted. At this time, the bottom surface of one side of the support protrusion may be formed in a diagonal line so that the support protrusion can be smoothly coupled inside the second fitting groove.

Accordingly, as shown in FIG. 12, the supporting protrusion is coupled to the second fitting groove only by inserting the supporting protrusion into the second fitting groove and then releasing the support protrusion while moving the stroller seat obliquely inclined toward the base platform.

Figure 13:
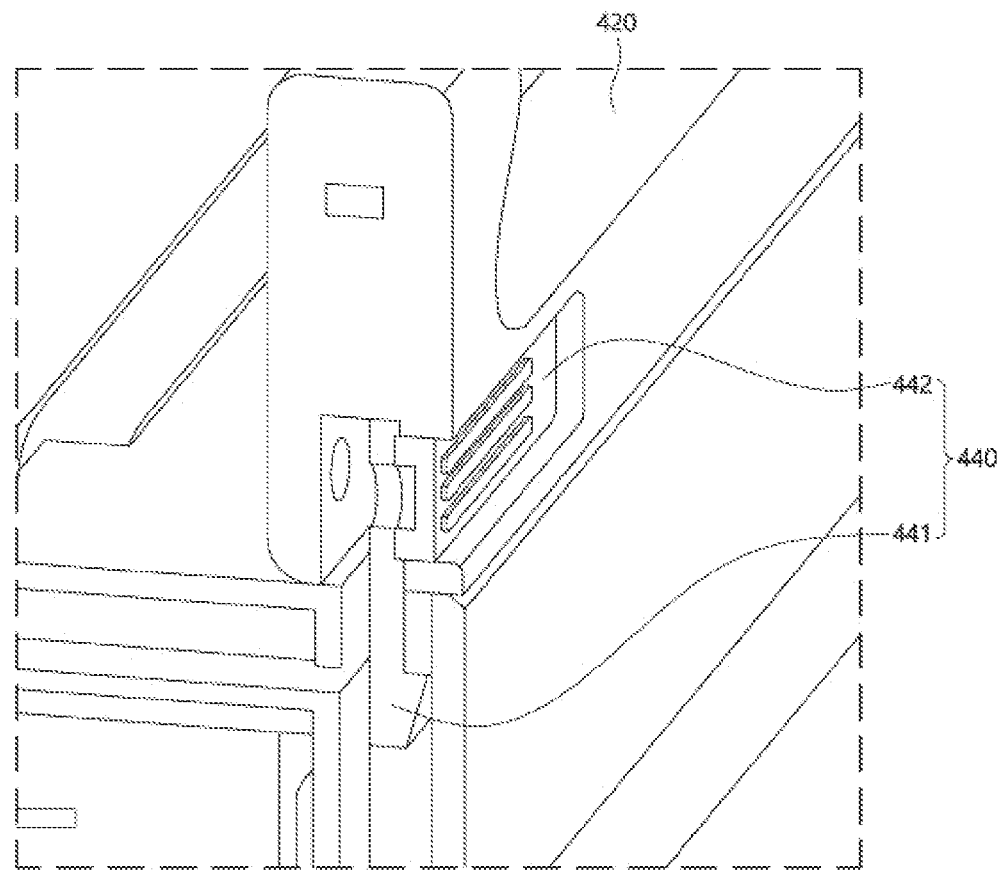
FIG. 13 is a partial cross-sectional view illustrating a state where the stroller module is hooked according to the present disclosure.

In addition, as shown in FIGS. 10 and 13, the hook coupler 440 may include a hook 441 installed to face downward at one side of the stroller frame and having a bent end while receiving a force pushed outward by the spring, and a button 442 exposed at one side of the stroller frame to apply the external force pushing the hook into the stroller frame by pressing the spring.

In correspondence with the hook coupler, the upper coupling part may be formed as the first fitting groove 132 having an empty interior to allow the hook to be inserted and providing a protrusion where a bent unit of the inserted hook is hung as shown in FIGS. 11 and 13.

At this time, one end surface of the hook is diagonally formed as shown in FIG. 13, and thus the hook slides down along the inner surface of the first fitting groove and can be smoothly coupled thereto after coupling at the insert-type coupler.

When the stroller seat is separated from the base platform, the hook may be easily separated by pushing the button, retracting the hook into the inner space of the first fitting groove, and lifting the hook upward as same as the case for the wagon seat.

As such, the upper coupling part formed at the base platform corresponding to the hook coupler of the wagon module and the stroller module uses the same first fitting groove, thereby making it possible to variously expand the use of the personal mobility device through a simple and compact connection structure.

The above detailed description should not be construed as limiting in all respects and should be considered as illustrative. The scope of the present disclosure should be determined by rational interpretation of the appended claims, and all changes within the equivalent scope of the present disclosure are included in the scope of the present disclosure.

The invention claimed is:

1. A modular interchangeable mobility device, comprising:
   an electric platform comprising:
   a base platform which comprises a plurality of wheels;

a motor configured to drive the plurality of wheels;

a battery configured to supply power to the motor; and an upper coupling part configured to be detachably coupled with an upper module located on the base platform; and a folding chair attached to the base platform and configured to provide a space for the upper module when folded, and when unfolded the folding chair is configured as a seat, wherein the modular interchangeable mobility device is an electric scooter.

2. The modular interchangeable mobility device of claim 1, wherein the folding chair comprises:

a chair seat on which a user can sit;

a frame connected to the chair seat and the base platform in a foldable manner, and configured to support the chair seat above the base platform when unfolded; and a folding restrictor configured to be engaged with the frame such that the frame is prevented from folding in an unfolded state.

3. The modular interchangeable mobility device of claim 2, wherein the folding restrictor includes:

a knob rotably attached to the base platform;

a coupling pin configured to move linearly by a rotation of the knob and configured to be inserted into a fixing hole of the frame; and a connection bar connected to the knob and the coupling pin, and configured to convert the rotation of the knob into a linear movement of the coupling pin.

4. The modular interchangeable mobility device of claim 3, wherein the folding restrictor further comprises a connection shaft passing through a shaft of the knob and coupled with the connection bar.

5. The modular interchangeable mobility device of claim 4, wherein the connection bar has a semicircular shape and is coupled between the coupling pin and the connection shaft by a rotatable fixing pin.

6. The modular interchangeable mobility device of claim 3, wherein the folding restrictor further comprises a pin fixing block fixed to the base platform and configured to allow the coupling pin to pass through.

7. The modular interchangeable mobility device of claim 1, wherein the upper module is a wagon module, and the wagon module includes:

a wagon seat providing a space; and a base coupling part attached to the wagon seat and configured to be coupled with the upper coupling part of the electric platform.

8. The modular interchangeable mobility device of claim 7, wherein the base coupling part comprises:

a insert coupler configured to be coupled with the upper coupling part by one of the insert coupler and the upper coupling part being inserted into the other; and a hook coupler fixing the wagon seat to the base platform by hooking the upper coupling part.

9. The modular interchangeable mobility device of claim 8, wherein the insert coupler comprises a fitting recess recessed inward from a lower surface of the wagon seat to provide a space into which the upper coupling part is inserted, and wherein the upper coupling part comprises a protrusion protruding upward from the base platform and bent toward the wagon seat to be inserted and fitted into the space of the fitting recess.

10. The modular interchangeable mobility device of claim 9, wherein the wagon seat further comprises a plurality of bottom protrusions protruding downward from a bottom surface of the wagon seat, and wherein the upper coupling part comprises correspondingly a plurality of grooves into which the plurality of bottom protrusions are fitted.

11. The modular interchangeable mobility device of claim 8, wherein the hook coupler comprises a hook mounted at one side of the wagon seat and comprising a bent end pushed outward by a spring, and a button exposed at one side of the wagon seat and configured to apply an external force of pressing the spring to push the hook in, and wherein the upper coupling part comprises a first fitting groove configured to allow the hook to be inserted.

12. The modular interchangeable mobility device of claim 1, wherein the upper module is a stroller module, and the stroller module comprises:

a stroller seat;

a stroller frame supporting the stroller seat apart from the base platform; and a base coupling part provided at a lower part of the stroller frame and configured to be coupled with the upper coupling part of the electric platform.

13. The modular interchangeable mobility device of claim 12, wherein the base coupling part comprises:

an insert coupler configured to be coupled with the upper coupling part by one of the insert coupler and the upper coupling part being inserted into the other; and the hook coupler fixing the stroller frame to the base platform by hooking the upper coupling part.

14. The modular interchangeable mobility device of claim 13, wherein the insert coupler comprises a fitting recess recessed inward from a lower surface of the wagon seat to provide a space into which the upper coupling part is inserted, and wherein the upper coupling part comprises a protrusion protruding upward from the base platform and bent toward the wagon seat to be inserted and fitted into the space of the fitting recess.

15. The modular interchangeable mobility device of claim 13, wherein the hook coupler comprises a hook mounted at one side of the wagon seat and comprising a bent end pushed outward by a spring, and a button exposed at one side of the wagon seat and configured to apply an external force of pressing the spring to push the hook in, and wherein the upper coupling part comprises a first fitting groove configured to allow the hook to be inserted.

* * * * *